350-6.7 SR
E197A XR 3,505,658
TX350-6.7
X350-6.8
3

BEAM ADDRESSABLE MEMORY SYSTEM

Filed July 8, 1966 3 Sheets-Sheet 1

*INVENTORS*
GEORGE J. FAN
C. DENIS MEE
*BY* George Baron
ATTORNEY

United States Patent Office 3,505,658
Patented Apr. 7, 1970

3,505,658

BEAM ADDRESSABLE MEMORY SYSTEM

George J. Fan, Ossining, N.Y., and Charles Denis Mee, Los Gatos, Calif., assignors to International Business Machines Corporation, Armonk, N.Y., a corporation of New York Filed July 8, 1966, Ser. No. 563,823
Int. Cl. G11c *11/14, 11/42*
U.S. Cl. 340—174 8 Claims

ABSTRACT OF THE DISCLOSURE

A polycrystalline gadolinium iron garnet thin film storage arrangement, employing a radiant energy beam for storage and retrieval of data, is provided with a rotating mirror for producing line scanning movement of the beam and an electro-optic deflector for transversely deflecting the beam between line scans.

This invention relates to memory files and, more particularly, to an apparatus especially adapted to employ a beam of light for accessing such files.

It is highly desirable, when employing such memories, to store information therein at high densities and to read the same at high speeds. Moreover, when new information must be entered into the memory file, or when old information must be altered, erased, or otherwise modified, it is very desirable to enter such new information or alteration at a very rapid rate. One mode of attaining such high reading and writing speeds and high densities is to rely on a high radiant energy source, such as a laser beam, and a storage medium that is sensitive to such a radiant energy source, both for reading and writing.

An example of a storage medium which will respond to radiant energization is a heat-sensitive gadolinium iron garnet film. Such a film is transparent and has large magneto-optical effects. The material has high coercivity when it is at its magnetic compensation temperature, the latter being at or near room temperature. When a discrete volume of such material is kept above its compensation temperature and is heated under the influence of a laser beam, the coercive force is reduced below the amplitude of an applied biasing field and the material is then magnetized in the direction of the bias field. This locally induced magnetism is retained by the heated spot when it cools. A stored bit can be interrogated or read out nondestructively by passing a beam of plane polarized light, i.e., a laser beam, through the bit storage position without heating the storage medium sufficiently to change its magnetic state. The interrogating beam, after its passage through the storage medium whose state is being sensed, is sent through an optical analyzer, the value of the stored bit being indicated either by a change or lack of change in intensity of the interrogating beam. Destructive readout or erasure of the storage medium can be accomplished by heating the latter sufficiently to cause, or permit, a change in its magnetic state.

A write/read procedure of the general type just described is disclosed in greater detail in a U.S. Patent 3,164,816 to Chang et al. that issued Jan. 5, 1965 on an application filed on Dec. 18, 1963. The present invention utilizes a storage medium similar to that disclosed in said Chang et al. patent, but it goes beyond the teaching of said patent in that it provides, for example a beam addressing procedure which involves very rapid line scanning of the contents of the memory, a feature not disclosed in said reference. The aforementioned Chang et al. beam-addressable memory system is designed primarily to address randomly selected individual bit positions, a relatively slow procedure.

The scheme shown and described herein achieves a selective line scanning of stored information by providing an electro-optic crystal for controlling with high accuracy the transverse displacements of a recording beam to select scanning lines or tracks and a constantly rotating mirror to provide rapid scanning of the selected line or track with maximum conservation of the beam energy. The reading and writing of information bits on an entire line at a time is inherently more rapid than randomly addressing individual bit positions. By employing a plurality of lasers instead of a single laser source, multiple tracks can be read simultaneously. Moreover, there is also employed with the electro-optical crystal and rotating mirror an electro-optic servo and modulator, the modulator being employed to allow for the passage or non-passage of laser light to the storage medium during writing, while the modulator is actuated by signals representative of binary data. The servo is employed during line or track finding operations as a fine adjustment, allowing for accurate selection of a memory track prior to the scanning of such track. The reason for such adjustment will be given hereinafter during the overall description of the invention.

Since the scanning must be rapid and the density of storage high in order to make our memory file economically advantageous over existing memory files, we have made an additional contribution to the art in the provision of a novel memory storage medium that is compatible with such speeds and densities. Such a medium comprises a film of polycrystalline gadolinium iron garnet which has storage properties superior to those of the single-crystal garnets heretofore employed. The polycrystalline garnet is activated in substantially the same manner as the single-crystal gadolinium iron garnet disclosed in Patent 3,164,816, but the polycrystalline form of the garnet provides extremely small storage spot sizes of the order of five microns. The polycrystalline form of the gadolinium iron garnet has such inherently high resolution characteristics that the spot size is substantially limited only by the dimensions of the point of the lasing beam that impinges on the thin film of the garnet serving as the storage medium.

It is an object of this invention to provide an improved beam-addressable memory file.

It is another object to provide a high-speed, high-density reversible memory file capable of readout by rapid line scanning.

It is still another object to attain line scanning of a beam-addressable memory employing a minimum of complex elements for carrying out such line scanning.

It is yet another object to attain simultaneously multiple line scanning of a beam addressable memory.

A further object is to supply a storage medium that is compatible with the high-density storage technique and high-speed scanning system disclosed herein.

The foregoing and other objects, features and advantages of the invention will be apparent from the following more particular description of preferred embodiments of the invention, as illustrated in the accompanying drawings.

Figures 1, 2:
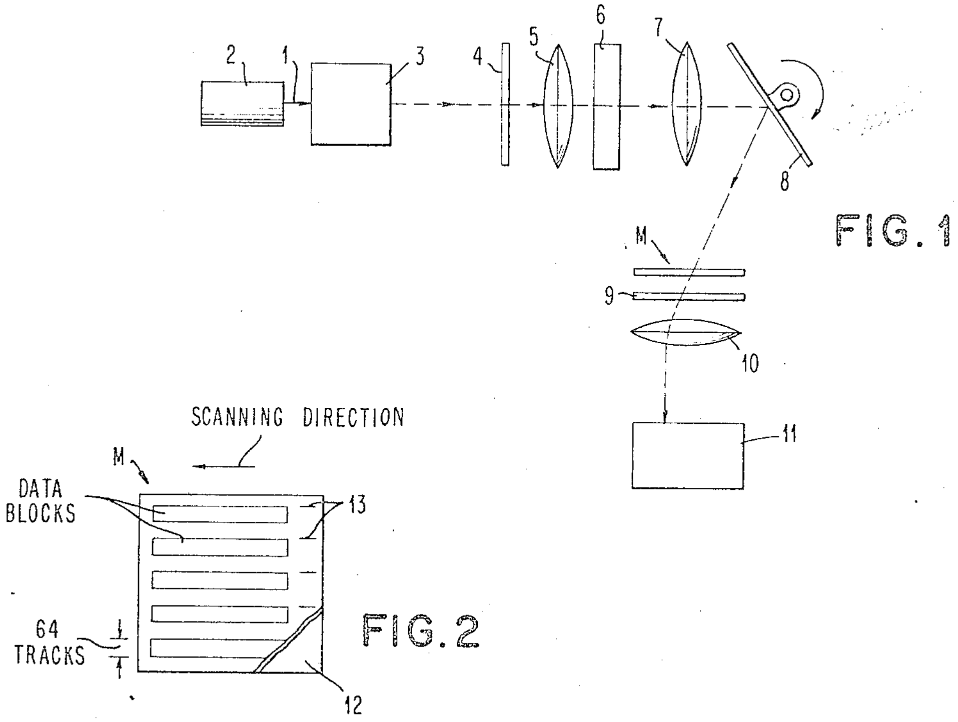
FIG. 1 is a schematic showing of a preferred embodiment of the invention employing a single laser source.
FIG. 2 is a plan view of the storage plane shown as part of the system of FIG. 1.

In FIG. 1, 2 is a laser capable of furnishing a polarized beam 1 of radiant energy which passes through an electro-optic deflector 3, the latter deflecting beam 1 in a direction perpendicular to the plane of the drawing into any of several line or track positions, each such position corresponding respectively to a particular scanning line or track on the storage medium M (see FIG. 2). If a data block on the storage medium M is composed of sixty-four tracks, then the deflector 3 is constructed so that it can be deflected to any one of sixty-four track positions. Obviously, a fewer or a greater number of tracks can be employed for each data block, depending upon the manner in which one wishes to allocate the storage space of the memory. A representative deflector would be that shown and described in the January 1964 issue of the IBM Journal of Research and Development, pages 64–67, and entitled "A Fast, Digital-Indexed Light Deflector" by Kulcke et al. Such a deflector is capable of positioning a light beam to any one out of a thousand linearly arranged positions at a deflection rate of $2\times10^6$ deflections per second.

After being selectively deflected by deflector 3, the beam 1 passes through a selected pinhole in screen 4, such screen having an array of pinholes wherein each hole corresponds to a different position of the deflected beam. Lens 5 is employed for further directing the deflected beam onto an electro-optic servo and modulator 6. It is understood, where the geometry permits its, pinholes 4 and lens 5 can be dispensed with, without detracting from the contribution of this invention. Modulators or optical shutters are well known in the optical art and serve to transmit or block the transfer of light in response to electrical signals. When it is desired to transmit laser light from source 2 to storage medium M, then the modulator is actuated with signals representative of a write "1" instruction to allow for the light modulator 6 to pass beam 1, whereas when such modulator 6 is actuated with signals representative of a write "0" instruction, the latter does not permit the passage of light beam 1 via lens 7 and rotating mirror 8 towards storage medium M. The rotating mirror 8 deflects beam 1 along a selected scanning track on such medium.

Figure 3:
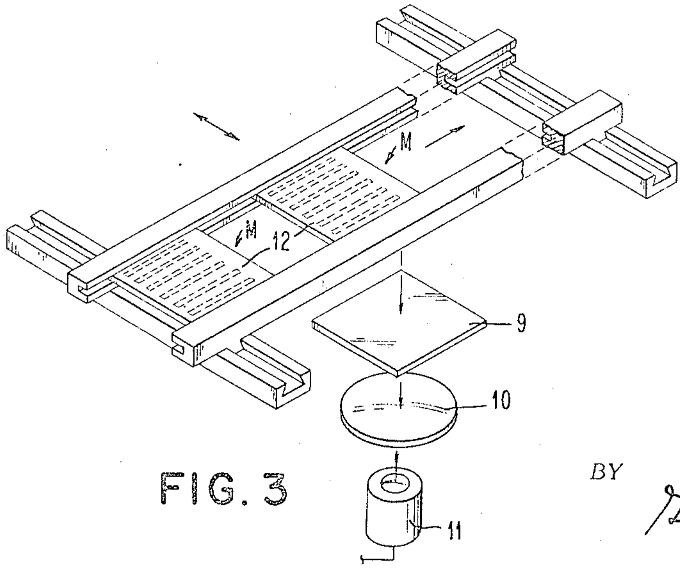
FIG. 3 is an enlarged view of a storage file that would contain all the information to be stored in the memory.

The role of device 6 as an electro-optic servo device is better understood by reference to FIGS. 2 and 3 in conjunction with FIG. 1. Storage medium M would normally comprise a square centimeter chip 12 of transparent material on which a thin film of polycrystalline gadolinimum iron garnet a few thousand angstroms thick is deposited. As many as fifteen data blocks, with sixty-four tracks in each data block, are stored in such chip 12, there being about $10^3$ bits per track. The total capacity of the memory chip is about $10^6$ bits per sq. cm. Associated with the beginning of each track on the chip 12 is an opaque line or tag 13, such tag 13 serving, a conjunction with electro-optic servo and modulator 6, to determine where and when to begin thescanning cycle.

Chip 12 is electro-mechanically positioned in a selected operating location between rotating mirror 8 and a detecting or sensing unit comprising analyzer 9, lens 10 and photo-sensing unit 11. FIG. 3 schematically shows how such location can take place. Once the chip is in position (assuming that this has been accomplished with perfect precision(, electro-optic deflector 3 is activated so as to select a given track of a data block, either for reading or writing. However, many electro-mechanical positioning units have a positioning accuracy that is less than the space occupied by three or four positions in the disclosed storage device. Consequently, before scanning commences, the servo portion of unit 6 causes the light beam to scan the chip in the vicinity of the nearest tag 13 until photo-sensing means 11 signals that the exact location of the first track of the selected data block has been sensed. When this has been accomplished, a particular line is selected by deflector 3, as above described. At such time, and only at such time, is the light beam permitted to perform an effective line scan. Until this condition is reached, the modulator 6 disables the beam while it is pasing over the bit storage areas of the chip, merely permitting it to sense the tag area of the chip.

It should be understood that where the chip can be positioned with exact accuracy, there is no need for tags 13 and a tag-finding servo mechanism. Moreover, although device 6 is illustrated as being a unitary structure, it is within the purview of this invention to provide two separate units, one providing light modulation and the other providing the servo adjustment. An example of a light-servo mechanism that can be used in the practice of this invention is shown and described in the Wolfe et al. Patent 3,121,216 that issued Feb. 14, 1964.

Since rotational speeds of $3\times10^3$ r.p.s. can be attained by mirrors such as mirror 8, and since a bit density of $10^6$ bits per sq. cm. allows for a bit size that is twice that of the actual spot size storing the information, one can attain a maximum access time of about $1/10^4$ seconds, or about 100 microseconds, for beam 1 to read any spot in a data block. For the size of chip chosen, less than ten degrees of mirror rotation is required for scanning a track. Of course, several chips, analyzers and detectors can be arranged around a mirror 8 if the latter is three-sided (see FIGS. 4 and 5) to further improve the access time. Where the memory file will include enough chips 12 to contain $10^8$ to $10^9$ bits, the access time will not exceed 30 milliseconds for a $10^9$-bit memory.

As is known in the prior art, as exemplified in the Chang et al. patent noted hereinabove, nondestructive readout of information stored in a track is accomplished either because the reading beam 1 is swept across the track at a sufficiently rapid rate so as not to heat up the medium and thus disturb the stored information, or the beam 1 has its intensity sufficiently reduced during reading so as to be ineffectual, during the time that it impinges on any point in an interrogated line of bits, to disturb the information stored in such line of bits. The final beam intensity that is sensed by the photo-sensing device 11 at any given instant is determined in each instance by the magnetic state of medium M at the bit storage position which is then being addressed.

Figure 4:
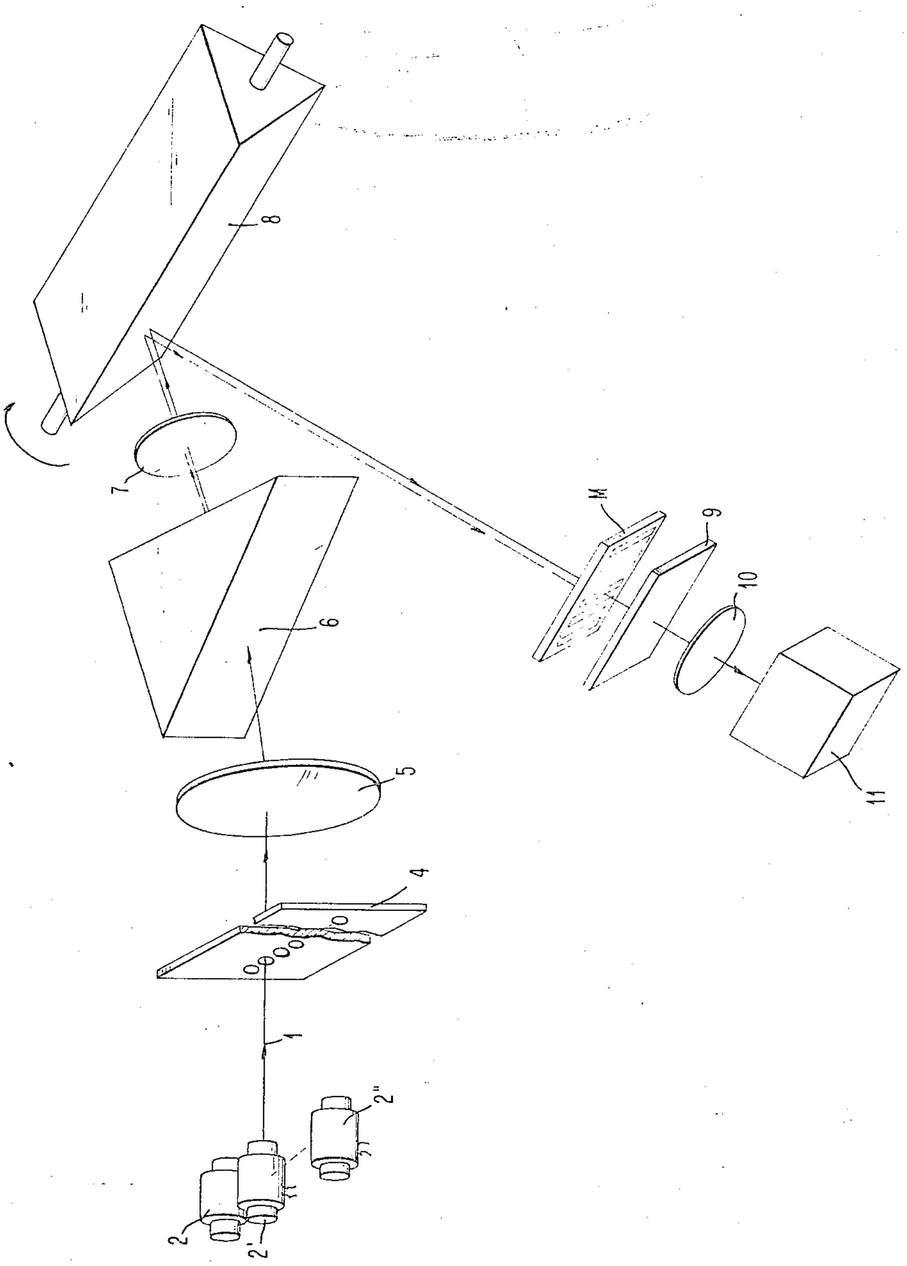
FIG. 4 is a modification of the embodiment of FIG. 1 and employs an array of lasers without the need for an electro-optic deflector.

Shown in FIG. 4 is an array of lasers 2, 2′, 2″, etc., there being a laser source for each of the tracks in a data block, or sixty-four sources in all. Now, when a chip 12 is positioned to its read/write state, any number of laser sources 2, 2′, etc. can be turned on. In this manner, any number of tracks in a data block can be scanned simultaneously, allowing for parallel read-in or readout of all the bits in a line. The deflector 3 of FIG. 1 is not needed in the embodiment of FIG. 4 because the array of lasers 2, 2′, 2″, etc. allow for individual track selection, there being a laser source for each track. A GaAs laser, being very small in size, makes an array of lasers feasible for small size scanning units.

Figure 5:
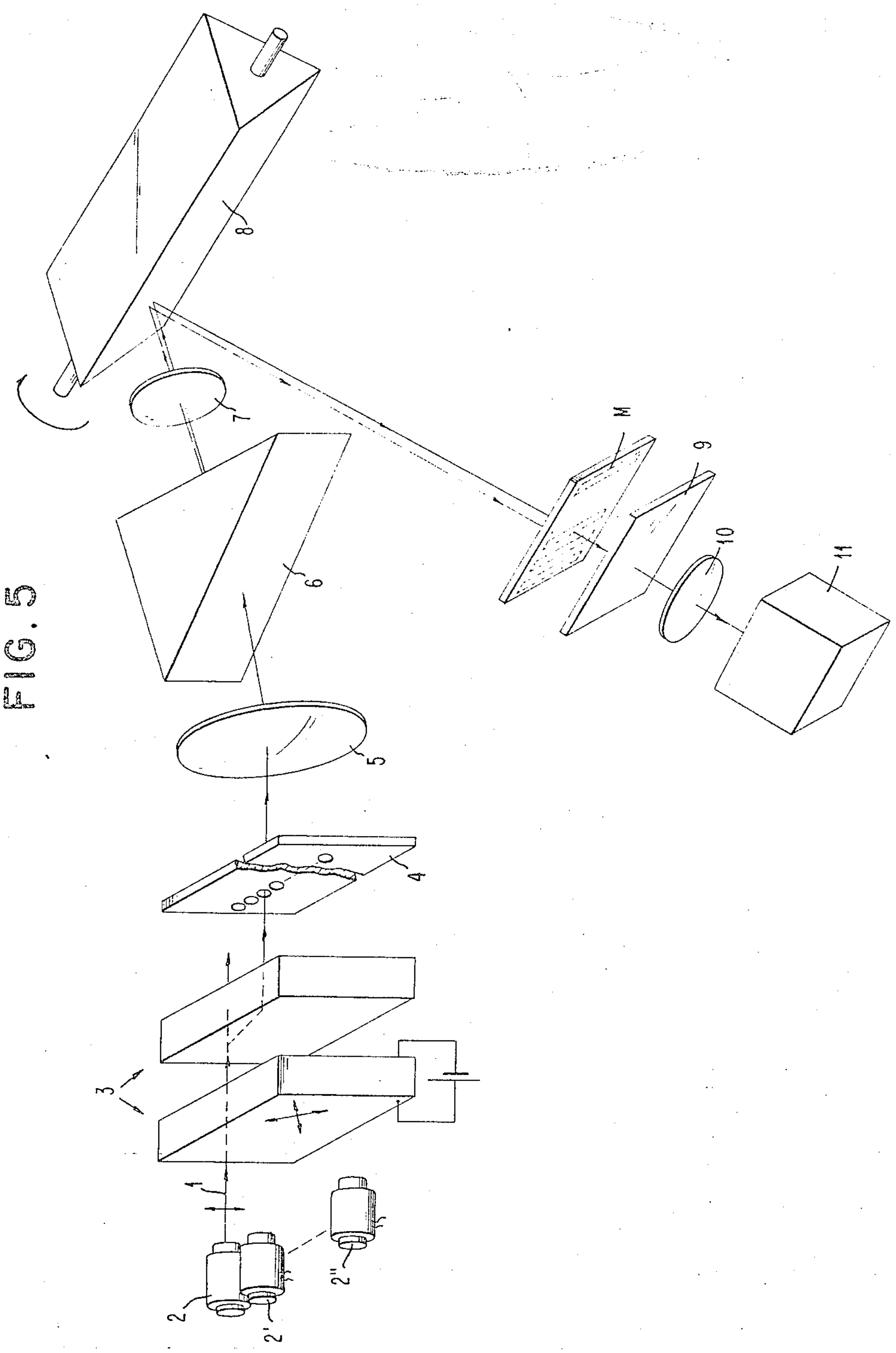
FIG. 5 is a modification of FIG. 1 wherein an array of lasers is employed with an electro-optic deflector.

In FIG. 5, an embodiment is shown to accommodate a scanning scheme using a fixed position of a chip 12. A laser is employed for each track, as shown in FIG. 4, but deflector 3 is employed so that the latter can choose that data block whose lines are to be scanned in parallel. In the embodiment of FIG. 5, different individual data blocks can be chosen before the tracks of that block are read out, singly or in parallel. In FIG. 4, without the use of deflector 3, a data block must be positioned in position before the individual tracks of that data block are scanned.

To summarize, the present invention allows for reading or writing of a whole line of bits at a time by deflecting a laser beam in one dimension electro-optically and in another dimension by means of a rotating mirror which produces a line scan. Such arrangement is used in conjunction with a magneto-optic storage medium, e.g., polycrystalline gadolinium iron garnet, that perceptibly acts on a beam of reduced intensity during reading operation (for example, by magneto-optically rotating the plane of polarization of the interrogating light during readout), but which is itself caused to change its magnetic state by a more intense beam of the same light during writing. Additionally, such scanning can be employed for parallel reading of a plurality of lines of bits.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a beam addressable memory system the combination including:
 an energy source producing a beam of radiant energy;
 a signal-controlled beam modulating means for modulating said beam of radiant energy;
 a rotating mirror means responsive to said beam for producing line scanning movement of said beam;
 an electro-optic deflector means for transversely deflecting said beam between the line scans of said line scanning movement; and
 a storage medium means responsive to be activated by said beam during writing operations and perceptibly acting upon said beam during reading operations.

2. The scanning device of claim 1 wherein means are provided for sensing the information stored in said storage medium means during each line scan.

3. The scanning device of claim 1 wherein said storage medium means is a thin film of polycrystalline gadolinum iron garnet.

4. In a beam addressable memory system the combination including:
 a source producing a beam of radiant energy;
 a signal-controlled beam modulating means for modulating said beam of radiant energy;
 a rotating mirror means responsive to said beam for producing line scanning movement of said beam for data reading and writing operations;
 an electro-optic deflector means for transversely deflecting the beam between the line scans of said line scanning movement;
 a storage medium means responsive to be activated by said beam during data writing operations and perceptibly acting upon said beam during data reading operations, said data being stored in data blocks and said medium means having indicia indicating the beginning of each block of data; and
 means for sensing said indicia prior to said data reading and writing operations.

5. A scanning device as defined in claim 4 wherein said storage medium means is polycrystalline gadolinium iron garnet.

6. A scanning device for a memory system including a radiant energy beam source and a memory unit organized into blocks of data with each of said blocks having a plurality of data tracks;
 a signal-controlled beam modulating means for modulating the radiant energy beam of said radiant energy beam source;
 a rotating mirror means responsive to said beam for producing line scanning movement of said beam on said memory unit;
 an electro-optic deflector means for transversely deflecting said beam to selected data blocks of said blocks of data; and
 means for sensing the first track of said plurality of tracks of said selected data blocks prior to scanning movement of said beam along said tracks in said selected data block.

7. A scanning device for a memory unit having data blocks and a plurality of information storage tracks in each of said data block; including,
 a plurality of radiant energy beams, one for each of said information storage tracks in a data block, for controlled scanning by said beams on said tracks;
 a signal-controlled beam modulating means for modulating said plurality of radiant energy beams;
 a rotating mirror means responsive to said beams for producing respective line scanning movement of said beams on said tracks; and
 a storage medium means capable of being activated by said beams during writing operations and perceptibly acting upon said beams during reading operations.

8. The device as set forth in claim 7 including an electro-optic deflector means for respectively transversely deflecting said plurality of beams between said data blocks.

References Cited

UNITED STATES PATENTS

| | | | |
|---|---|---|---|
| 3,109,933 | 11/1963 | Baumann | 340—173 |
| 3,164,816 | 1/1965 | Chang et al. | 340—174 |

JAMES W. MOFFITT, Primary Examiner

U.S. Cl. X.R.

250—219